United States Patent
Register

(10) Patent No.: US 10,953,590 B2
(45) Date of Patent: *Mar. 23, 2021

(54) ELECTROMAGNETIC SUPPORT TOOLING FOR COMPOSITE PART CURING

(71) Applicant: The Boeing Company, Chicago, IL (US)

(72) Inventor: Justin Register, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,759

(22) Filed: Mar. 13, 2019

(65) Prior Publication Data
US 2019/0210253 A1    Jul. 11, 2019

Related U.S. Application Data

(62) Division of application No. 15/005,156, filed on Jan. 25, 2016, now Pat. No. 10,272,596.

(51) Int. Cl.
*B29C 53/82* (2006.01)
*B29C 33/40* (2006.01)
*B29C 33/48* (2006.01)

(52) U.S. Cl.
CPC .......... *B29C 53/824* (2013.01); *B29C 33/40* (2013.01); *B29C 33/48* (2013.01); *B29C 33/485* (2013.01); *B29K 2995/0008* (2013.01)

(58) Field of Classification Search
CPC ..... B29C 33/48; B29C 53/824; B29C 33/485; B29C 33/40; B29C 70/446; B29K 2995/0008

See application file for complete search history.

(56) References Cited

U.S. PATENT DOCUMENTS 2,456,513 A * 12/1948 Johnson ................ B29C 70/446
264/314
3,425,642 A    2/1969 May
(Continued)

FOREIGN PATENT DOCUMENTS

WO    WO 00/18566    4/2000

OTHER PUBLICATIONS

Dorfmann, "Magnetoelastic modelling of elastomers", 2003, European Journal of Mechanics A/Solids, 22.4, pp. 497-507; https://www.sciencedirect.com/science/article/pii/S0997753803000676 (Year: 2003).*

(Continued)

*Primary Examiner* — Joseph S Del Sole
*Assistant Examiner* — Jerzi H Moreno Hernandez
(74) *Attorney, Agent, or Firm* — McDonnell Boehnen Hulbert & Berghoff LLP

(57) ABSTRACT

Methods and apparatuses for electromagnetic support tooling for use in composite part curing are described. In one example, a support tooling, such as a mandrel, includes an elastomeric housing that has ferromagnetic components. The mandrel also has electro-magnetic coils positioned within the elastomeric housing and operable to generate magnetic fields to repel or attract the ferromagnetic components of the elastomeric housing to the electro-magnetic coils. When the ferromagnetic components of the elastomeric housing are repelled by the electro-magnetic coils, the elastomeric housing has a rigid surface state. When the ferromagnetic components of the elastomeric housing are attracted to the electro-magnetic coils, the elastomeric housing is collapsed.

20 Claims, 5 Drawing Sheets

(56) References Cited

U.S. PATENT DOCUMENTS

| | | | |
|---|---|---|---|
| 3,618,350 | A | 11/1971 | Larrimer et al. |
| 3,619,866 | A * | 11/1971 | Hofmann ................ B22C 9/061 |
| | | | 425/3 |
| 4,462,787 | A | 7/1984 | Bogardus, Jr. et al. |
| 4,969,972 | A | 11/1990 | Kunz |
| 5,126,979 | A * | 6/1992 | Rowe, Jr. ................ G10K 9/121 |
| | | | 181/110 |
| 5,826,320 | A | 10/1998 | Rathke et al. |
| 5,939,007 | A * | 8/1999 | Iszczyszyn ........... B29C 70/541 |
| | | | 264/258 |
| 7,357,166 | B2 | 4/2008 | Pham et al. |
| 8,043,457 | B2 * | 10/2011 | Jones .................... B29C 33/301 |
| | | | 156/173 |
| 8,293,051 | B2 | 10/2012 | Morris et al. |
| 8,430,984 | B2 | 4/2013 | Lee et al. |
| 8,800,953 | B2 | 8/2014 | Morris et al. |
| 8,974,217 | B2 | 3/2015 | Everhart et al. |
| 9,827,720 | B2 | 11/2017 | Heath et al. |
| 10,272,596 | B2 * | 4/2019 | Register ................. B29C 33/00 |
| 2005/0211870 | A1 | 9/2005 | Browne et al. |
| 2007/0182049 | A1 * | 8/2007 | Longo .................... B29C 33/54 |
| | | | 264/71 |
| 2010/0154990 | A1 * | 6/2010 | Brennan ................ B29C 70/30 |
| | | | 156/285 |
| 2012/0305197 | A1 | 12/2012 | Vander Wel et al. |
| 2014/0354381 | A1 | 12/2014 | Kohlhafer |
| 2017/0133139 | A1 | 5/2017 | Hegenbart et al. |
| 2017/0210034 | A1 | 7/2017 | Register |

OTHER PUBLICATIONS

Gage, "The principles of physics", 1901, Ginn, pp. 536-540; available in Google Books (Year: 1901).*

Lagorce et al., "Magnetic microactuators based on polymer magnets", 1999, Journal of Microelectromechanical Systems, 8(1), pp. 1-9. (Year: 1999).

Notice of Reasons for Rejection issued by the Chinese Patent Office in application No. 2016-212702, dated Nov. 30, 2020.

* cited by examiner

ELECTROMAGNETIC SUPPORT TOOLING FOR COMPOSITE PART CURING

CROSS REFERENCE TO RELATED APPLICATION

The present disclosure claims priority to and is a divisional of U.S. application Ser. No. 15/005,156 filed on Jan. 25, 2016, the entire contents of which are herein incorporated by reference.

FIELD

The present disclosure generally relates to methods and equipment for fabricating composite resin parts, and more particularly to an electromagnetic mandrel system used in curing composite parts.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may require a tool such as a supporting bladder that is placed in the cavity to ensure that the part geometry is properly maintained during application of composite material or when processed under autoclave pressure. The supporting bladder may be an inflatable bladder that can easily fit into an internal cavity prior to cure and then be inflated during an autoclave cure process so as to react to the autoclave pressure force applied to the part. Typically, such inflatable bladders are pressurized by venting them to the autoclave pressure through a vacuum bag.

However, the bladders that are used to support a composite part (e.g., a stringer or other longitudinal structural piece in a framework) for autoclave curing may not suitable when alternatively curing the part out-of-autoclave (e.g., as performed with repairs). In this case, the part and the bladder are exposed to different temperature and pressure conditions than in an autoclave such that an inflatable bladder may not perform properly and could in fact negatively impact final part characteristics. This creates a need for a support tool that can fit into a composite part cavity prior to cure, can conform to the internal geometry of the part cavity during out-of-autoclave curing, and finally can reduce in size to be removed from the part after cure.

SUMMARY

In one example, a mandrel is described that comprises an elastomeric housing having ferromagnetic components, and one or more electro-magnetic coils positioned within the elastomeric housing and operable to generate one or more magnetic fields to repel or attract the ferromagnetic components of the elastomeric housing to the one or more electro-magnetic coils. When the ferromagnetic components of the elastomeric housing are repelled by the one or more electro-magnetic coils, the elastomeric housing has a rigid surface state. When the ferromagnetic components of the elastomeric housing are attracted to the one or more electro-magnetic coils, the elastomeric housing is collapsed.

In another example, another mandrel is described that comprises an elastomeric housing having a polarized magnetic material, and one or more electro-magnetic coils positioned within the elastomeric housing and operable to generate one or more magnetic fields to repel or attract the ferromagnetic components of the elastomeric housing to the one or more electro-magnetic coils. When the ferromagnetic components of the elastomeric housing are repelled by the one or more electro-magnetic coils, the elastomeric housing has a first volume. When the ferromagnetic components of the elastomeric housing are attracted to the one or more electro-magnetic coils, the elastomeric housing has a second volume that is smaller than the first volume.

In yet another example, a method is described comprising providing an elastomeric housing having ferromagnetic components, and operating one or more electro-magnetic coils in the elastomeric housing to generate one or more magnetic fields to repel or attract the ferromagnetic components of the elastomeric housing to the one or more electro-magnetic coils. When the ferromagnetic components of the elastomeric housing are repelled by the one or more electro-magnetic coils, the elastomeric housing has a rigid surface state. When the ferromagnetic components of the elastomeric housing are attracted to the one or more electro-magnetic coils, the elastomeric housing is collapsed.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, mechanical support tooling and/or mandrel for composite part curing is described. Additionally, controlled electromagnetic induced extraction of a cured composite part from the elastomeric tooling mandrel is described. The mandrel may comprises an elastomeric housing that has ferromagnetic components, and an electro-magnetic coil positioned within the elastomeric housing that is operable to generate a magnetic field to repel or attract the ferromagnetic components of the elastomeric housing to the electro-magnetic coil. When the ferromagnetic components of the elastomeric housing are repelled by the electro-magnetic coil, the elastomeric housing has a rigid surface state and when the ferromagnetic components of the elastomeric housing are attracted to the electro-magnetic coil, the elastomeric housing is collapsed. Thus, by utilizing a magnetic field to attract or repel an outer elastomeric bladder from or to a center coil, the housing may be rigid or collapsed.

As one example, an outer elastomeric bladder of the mandrel is molded with a homogeneous mixture of a ferrous powder or similar within the elastomer. The bladder is assembled over a solid mandrel tool. Incorporated within the mandrel may be one or a series of electro-magnetic coils configured such that when activated the outer elastomeric bladder is repelled or attracted to the hard tooling form.

The mandrel can be used to fill a cavity of the composite part that needs to be cured, and then can reduce in size (e.g., such as a reduction in cross-sectional dimension) to be pulled out and removed. Geometry of the mandrel allows the mandrel to reduce in size to be inserted into an uncured composite part and then expanded to form a solid stiffener capable of withstanding out-of-autoclave cure pressure. The mandrel is further reusable since the mandrel can be reduced in size after cure to be removed from the part.

Figure 1:
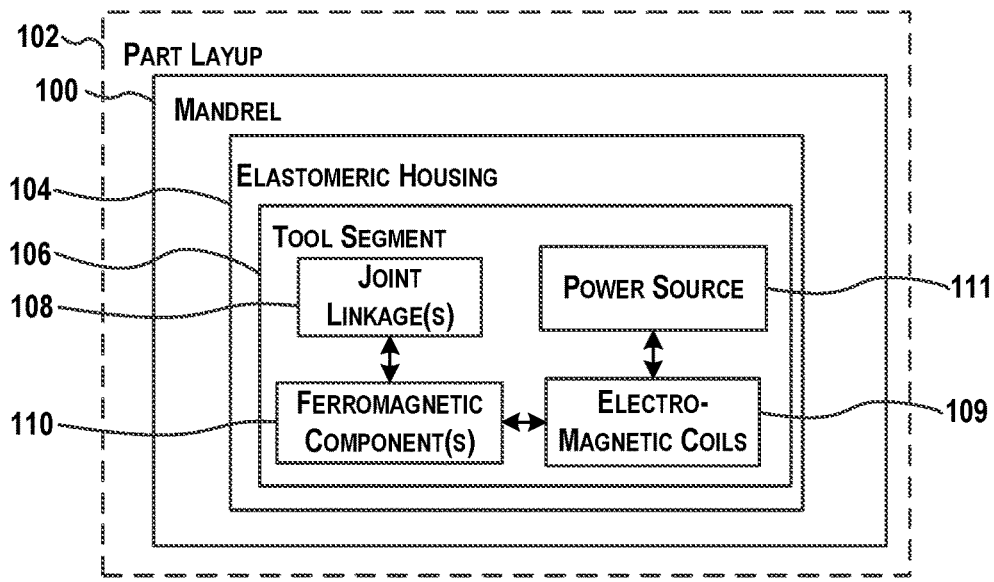
FIG. 1 illustrates an example system including a mandrel be used to form and/or cure a part layup, according to an example embodiment.

Referring now to FIG. 1, a mandrel 100 may be used to form and/or cure a part layup 102 comprising multiple plies (not shown) of fiber reinforced polymer resin, according to an example embodiment. For example, multiple plies of fiber reinforced polymer plies are laid up over the mandrel 100 in order to form the plies into a desired part shape. The part layup 102 may partially or fully surround the mandrel 100, such that the mandrel 100 is at least substantially enclosed by the part layup 102. The mandrel 100 includes an elastomeric housing 104 in which a tool segment 106 is positioned, and the elastomeric housing 104 forms an enclosure that may collapse inwardly when the elastomeric housing 104 is placed into a flexible state to allow the mandrel 100 to be withdrawn from the part layup 102 either after the layup is compacted and/or cured. The tool segment 106 may be expanded and collapsed to allow for removal. The tool segment 106 may further include joint linkage(s) 108 that allow for connection to other tool segments. The elastomeric housing 104 of the tool segment 106 further includes ferromagnetic components 110 within the elastomeric housing 104. One or more electro-magnetic coils 109 are positioned within the elastomeric housing 104 and are operable to generate magnetic fields to repel or attract the ferromagnetic components 110 of the elastomeric housing 104 to the electro-magnetic coils 109. When the ferromagnetic components 110 of the elastomeric housing 104 are repelled by the electro-magnetic coils 109, the elastomeric housing 104 has a rigid surface state. When the ferromagnetic components 110 of the elastomeric housing 104 are attracted to the electro-magnetic coils 109, the elastomeric housing 104 is flexible or collapsed.

In another example, when the ferromagnetic components 110 of the elastomeric housing 104 are repelled by the electro-magnetic coils 109, the elastomeric housing 104 has a first volume. When the ferromagnetic components 110 of the elastomeric housing 104 are attracted to the electro-magnetic coils 109, the elastomeric housing 104 has a second volume that is smaller than the first volume, and thus, can be removed from the composite part being cured.

A power source 111 may also be included within the tool segment 106 to operate the electro-magnetic coils 109. In another example, the power source 111 may be a component separate from the mandrel 100, and may be in wired communication to the electro-magnetic coils 109 to power the electro-magnetic coils 109.

The mandrel 100 may be formed of any elastomeric material, such as Teflon® (E.I. du Pont de Nemours and Company) coated silicone or hard rubber, and may be pliable to enable the mandrel 100 to conform to various configurations. The elastomeric housing 104 may be formed, for example and without limitation, from flexible silicon rubber, and thus, the elastomeric housing 104 may be a flexible housing or an elastomer housing such that the housing may contact the uncured composite layup without damage to the layup and/or without contamination to the layup.

The ferromagnetic components 110 may be pieces of magnets composed of any type of magnetic material and arranged within the elastomeric housing 104 in a predetermined manner. As one example, the elastomeric housing 104 may include a mixture of the ferromagnetic components 110 and rubber such that the ferromagnetic components 110 are embedded within the elastomeric housing 104. As another example, the ferromagnetic components 110 may comprise a polarized magnetic material, or other type of permanent magnets including any kind of magnetic material such as neodymium-iron-boron or any of the rare Earth magnets. The ferromagnetic components 110 may be separate solid components included in walls of the elastomeric housing 104 (such as individual pieces of magnet material), or may be magnetic particles homogeneously mixed within a surface of the elastomeric housing 104 in a predetermined manner. The ferromagnetic components 110 may further include smaller magnetic particles (e.g., small pieces of magnets) embedded in the elastomer housing 104. Any type of magnets may be used for the ferromagnetic components 110. The ferromagnetic components 110 may also be structures that are disposed within, but are separate from the elastomeric housing 104.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 100 and the tool segment 106 to form the part layup 102 is illustrated in FIG. 2.

Figure 2:
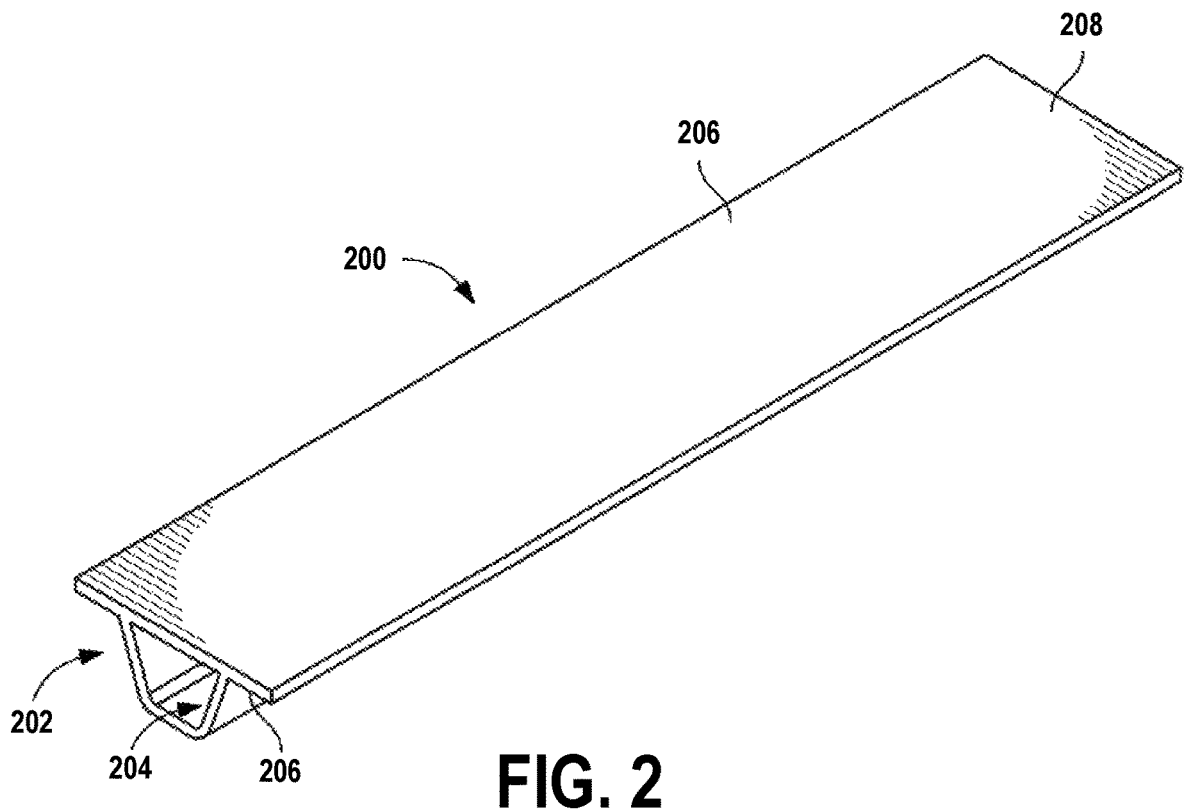
FIG. 2 illustrates an example of a composite component that may benefit from use of the mandrel as described in FIG. 1, according to an example embodiment.

In FIG. 2, the disclosed flexible apparatus and curing method may be employed to cure a variety of composite resin parts of various geometries, having one or more internal cavities. For example, and without limitation, the disclosed flexible bladder and curing method may be used in fabrication of a fiber reinforced composite resin stringer 200. In one arrangement, the stringer 200 may comprise a multi-ply layup of prepreg. In the illustrated arrangement, the stringer 200 comprises a hat section 202 forming an internal stringer cavity 204, a pair of laterally extending flange sections 206, and a substantially flat skin section 208 that is consolidated together with the flange sections 206 during curing. As those of ordinary skill in the art will recognize, alternative stringer geometries are possible.

The stringer 200 may be fabricated using the mandrel 100 and the tool segment 106 in FIG. 1 by applying the part layup 102 to the mandrel 100 with the tool segment 106 inserted into the mandrel 100. After curing, the part layup 102 forms the stringer 200. The tool segment 106 fills the stringer cavity 204 that is a hollow trapezoidal space or opening. The tool segment 106 functions to so as to maintain a shape and contour of the stringer 200 during cure and is collapsible to be reduced in size and is removable after cure.

In other embodiments, the stringer 200 is preformed and is uncured. The mandrel 100 may have a cross-section that can reduce in size so that the mandrel 100 can be positioned within the stringer cavity 204 and has a shape that substantially conforms to the corresponding stringer cavity 204 when the mandrel 100 is expanded such that the mandrel 100 and elastomeric housing 104 may provide support to the stringer 200 during curing. The mandrel 100 of the illustrated embodiment has a trapezoidal shape to conform to a hat-shaped stringer 200, although the mandrel could have any number of other shapes to conform to differently shaped stringers.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Similarly, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

Example composite material used for the stringer 200 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 100 (or mold) to pre-form the tape or fabric into a desired shape of the stringer 200 as defined by the mandrel 100. The stringer 200 could be any suitable dimension to provide various degrees of reinforcement, and could comprise any number of plies of prepreg tape or fabric.

FIGS. 3-10 illustrate example configurations of the elastomeric housing 104 that show various arrangements of the ferromagnetic components 110 within or on the elastomeric housing 104, according to example embodiments. In FIGS. 3-10, the elastomeric housing 104 has a substantially trapezoidal shape. This trapezoidal shape works well to fill the stringer cavity 204 of the stringer 200, shown in FIG. 2, for curing. In other examples, the elastomeric housing 104 may be configured in other shapes as needed to fill a specific cavity of a composite part. As an example, the elastomeric housing 104 may be rectangular or square instead of a triangular shape. In still other examples, the elastomeric housing 104 may form a rounded hat shape, or still other shapes are possible depending on application of the mandrel 100.

Figure 3:
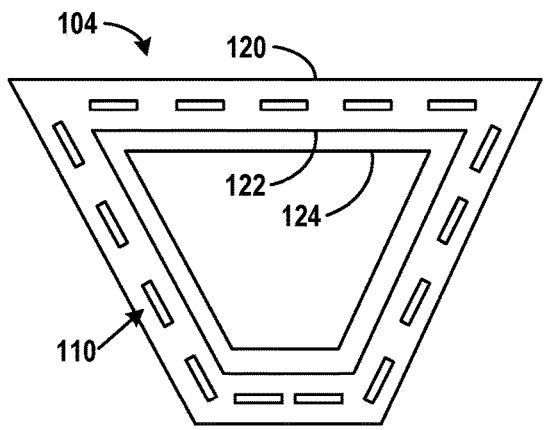
FIG. 3 illustrates an example configuration of the elastomeric housing in which the ferromagnetic components are embedded within at least one of a plurality of walls of the elastomeric housing, according to an example embodiment.

FIG. 3 illustrates an example configuration of the elastomeric housing 104 in which the ferromagnetic components 110 are embedded within at least one of a plurality of walls of the elastomeric housing 104, according to an example embodiment. In FIG. 3, the elastomeric housing 104 includes an outer wall 120, and inner walls 122 and 124. The ferromagnetic components 110 are embedded between the outer wall 120 and the inner wall 122. The ferromagnetic components 110 are shown as strips of pieces of material arranged in a predetermined manner within the wall. The inner walls 122 and 124 may define an optional secondary internal structure or bladder that is within the elastomeric housing 104, for example. The ferromagnetic components 110 may be positioned outside of this secondary internal structure.

Figure 4:
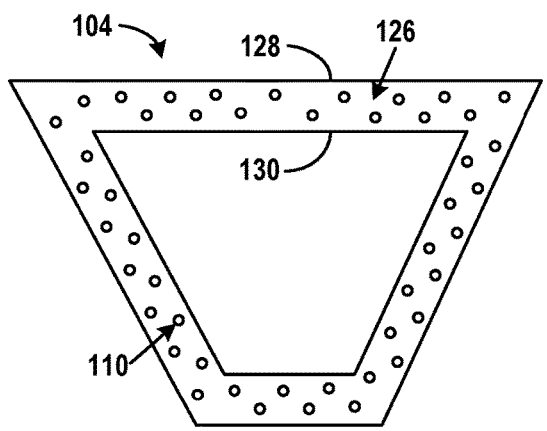
FIG. 4 illustrates another example configuration of the elastomeric housing in which the ferromagnetic components are embedded within a wall of the elastomeric housing, according to an example embodiment.

FIG. 4 illustrates another example configuration of the elastomeric housing 104 in which the ferromagnetic components 110 are embedded within a wall 126 of the elastomeric housing 104, according to an example embodiment.

The wall 126 may be defined by an exterior surface 128 and an interior surface 130. In this example, the ferromagnetic components 110 are shown as circular pieces of material dispersed within the wall 126, however, the ferromagnetic components 110 may be any size or shape as desired for a specific application of the mandrel 100.

Figure 5:
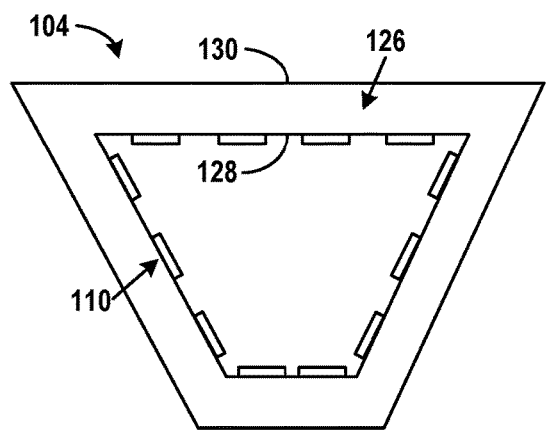
FIG. 5 illustrates another example configuration of the elastomeric housing in which the ferromagnetic components are positioned on an interior surface of the wall of the elastomeric housing, according to an example embodiment.

FIG. 5 illustrates another example configuration of the elastomeric housing 104 in which the ferromagnetic components 110 are positioned on an interior surface 128 of the wall 126 of the elastomeric housing 104, according to an example embodiment. The wall 126 has the interior surface 128 and an exterior surface 130, and in the configuration shown in FIG. 5, the ferromagnetic components 110 include strips of magnetic material positioned on the interior surface 128 of the wall 126. The ferromagnetic components 110 may be adhesively fixed to a position on the interior surface 128 using an epoxy, for example.

Figure 6:
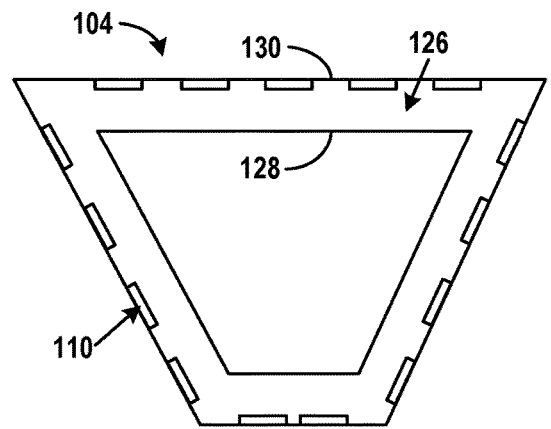
FIG. 6 illustrates another example configuration of the elastomeric housing in which the ferromagnetic components are positioned on the exterior surface of the wall of the elastomeric housing, according to an example embodiment.

FIG. 6 illustrates another example configuration of the elastomeric housing 104 in which the ferromagnetic components 110 are positioned on the exterior surface 130 of the wall 126 of the elastomeric housing 104, according to an example embodiment. In this configuration, the ferromagnetic components 110 may be adhesively fixed to a position on the exterior surface 130 using an epoxy, for example. In addition, in FIG. 6, the ferromagnetic components 110 are embedded in the exterior surface 130 so that the ferromagnetic components are flush with the exterior surface 130. This may be useful for installation to avoid mark off or other indentations in a final cured part causes by the ferromagnetic components 110.

Thus, as shown in FIGS. 5-6, the ferromagnetic components 110, or polarized magnetic material, can be positioned on the interior surface 128 or the exterior surface 130 of the elastomeric housing 104.

As shown in FIGS. 3-6, the ferromagnetic components 110 are positioned substantially homogeneously throughout the elastomeric housing 104. However, in some examples, the ferromagnetic components 110 may be positioned only along one side of the wall 126, or along a top and a bottom of the wall 126, or along sides of the wall 126, or along any combination of the top, the bottom, and the sides of the wall 126, for example. For instance, in some examples, the components may be evenly distributed due to an application requiring full surface rigidity of the elastomeric housing 104, and in other examples, the components may be positioned at specific locations corresponding to part configuration under cure and a need for pressure in certain locations during cure.

Figure 7:
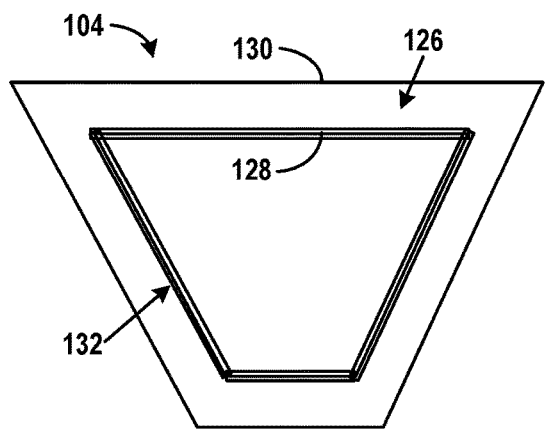
FIG. 7 illustrates another example configuration of the elastomeric housing in which the ferromagnetic components comprise a coating on the interior surface of the wall, according to an example embodiment.
Figure 8:
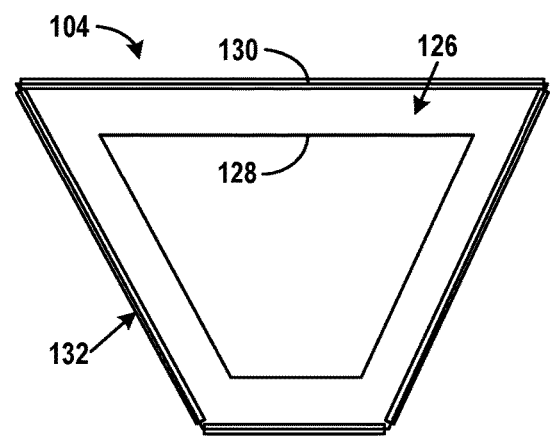
FIG. 8 illustrates another example configuration of the elastomeric housing in which the ferromagnetic components comprise the coating on the exterior surface of the wall, according to an example embodiment.

FIG. 7 illustrates another example configuration of the elastomeric housing 104 in which the ferromagnetic components 110 comprise a coating 132 on the interior surface 128 of the wall 126, according to an example embodiment. FIG. 8 illustrates another example configuration of the elastomeric housing 104 in which the ferromagnetic components 110 comprise the coating 132 on the exterior surface 130 of the wall 126, according to an example embodiment. The coating 132 may include a thin film of magnetic material, such as a foil, that can be applied to a surface of the wall. A thickness of the coating 132 may be dependent upon a type of material used, and may in some instances include between about 0.05 inches to about 2 inches, for example. The coating 132 may provide sufficient flexibility during the cure process as well.

Figure 9:
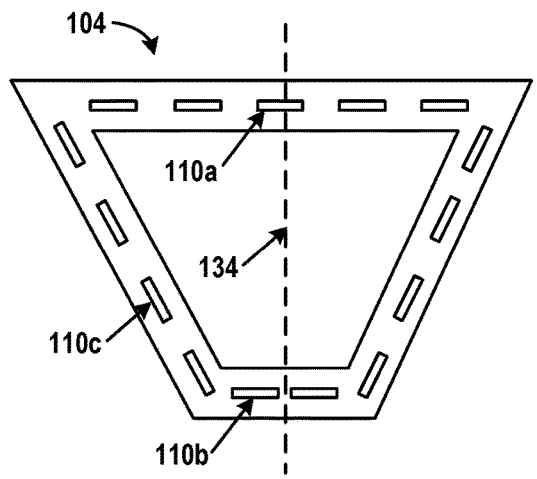
FIG. 9 illustrates an example configuration of the elastomeric housing in which some of the ferromagnetic components are positioned laterally along the elastomeric housing so as to be linearly perpendicular to a centerline of the elastomeric housing, according to an example embodiment.

FIG. 9 illustrates an example configuration of the elastomeric housing 104 in which some of the ferromagnetic components 110*a-b* are positioned laterally along the elastomeric housing 104 so as to be linearly perpendicular to a centerline 134 of the elastomeric housing 104, according to an example embodiment. In addition, other ferromagnetic components, such as the ferromagnetic component 110*c*, may be positioned at an angle of about 45° with respect to the centerline 134.

Figure 10:
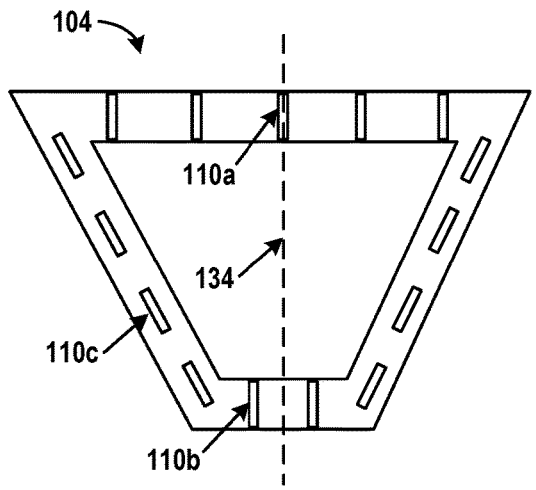
FIG. 10 illustrates an example configuration of the elastomeric housing in which some of the ferromagnetic components are positioned longitudinally along the elastomeric housing so as to be linearly parallel to the centerline of the elastomeric housing, according to an example embodiment.

FIG. 10 illustrates an example configuration of the elastomeric housing 104 in which some of the ferromagnetic components 110*a-b* are positioned longitudinally along the elastomeric housing 104 so as to be linearly parallel to the centerline 134 of the elastomeric housing, according to an example embodiment. Again in this configuration, the ferromagnetic component 110*c* may be positioned at an angle of about 45° with respect to the centerline 134.

Thus, as shown in FIGS. 9-10, the ferromagnetic components 110, or the polarized magnetic material, can be positioned laterally along the elastomeric housing 104 so as to be linearly perpendicular to the centerline 134 or longitudinally along the elastomeric housing 104 so as to be linearly parallel to the centerline 134. Any combination of layouts of the ferromagnetic components 110 may also be used so as to provide the ferromagnetic components 110 positioned laterally, longitudinally, diagonally, or all of these arrangements as well within the elastomeric housing 104. Each different configuration may be used for optimization of pressure needed based on a configuration of the part undergoing cure.

Figure 11:
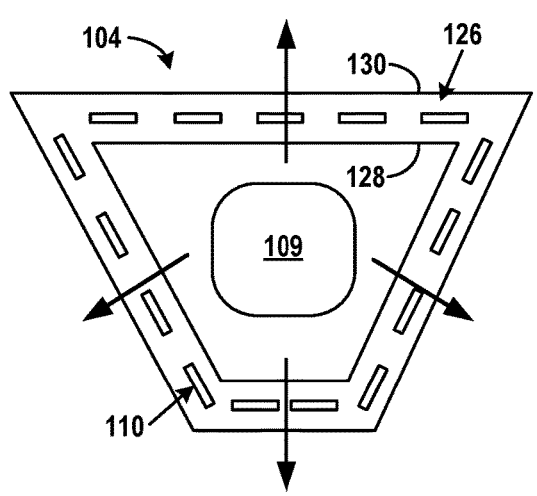
FIG. 11 illustrates an example configuration of the elastomeric housing with the electro-magnetic coil positioned in the elastomeric housing, according to an example embodiment.

FIG. 11 illustrates an example configuration of the elastomeric housing 104 with the electro-magnetic coil 109 positioned in the elastomeric housing 104, according to an example embodiment. In the example shown in FIG. 11, the electro-magnetic coil 109 is positioned equidistance from the top, the bottom, and the sides of the wall 126 of the elastomeric housing 104. In some examples, the electro-magnetic coil 109 can be positioned equidistance from portions of the interior surface 128 of the wall 126 in instances in which the elastomeric housing 104 may be circular, for example.

FIG. 11 illustrates the elastomeric housing 104 having a rigid exterior surface 130. In FIG. 11, the electro-magnetic coil 109 is operated to generate magnetic fields to repel the ferromagnetic components 110 of the elastomeric housing 104 outward as shown by the arrows. In this way, the magnetic field pushes the ferromagnetic components 110 away from the electro-magnetic coil 109. The electro-magnetic coil 109 is suspended within the elastomeric housing 104 when operated to generate the magnetic fields. When not being operated, the electro-magnetic coil 109 may fall to a bottom wall of the elastomeric housing 104 due to gravity. The electro-magnetic coil 109 may alternatively be positioned within a container inside the elastomeric housing 104 that holds the electro-magnetic coil 109 within a center area of the elastomeric housing 104.

Figure 12:
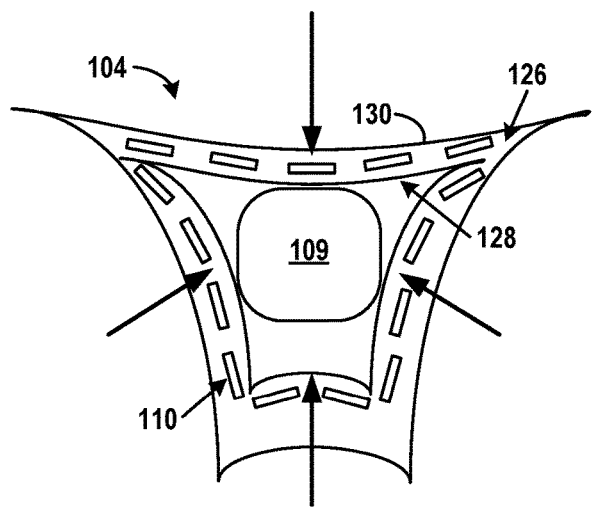
FIG. 12 illustrates an example configuration of the elastomeric housing with the electro-magnetic coil positioned in the elastomeric housing and operated to collapse the elastomeric housing, according to an example embodiment.

FIG. 12 illustrates an example configuration of the elastomeric housing 104 with the electro-magnetic coil 109 positioned in the elastomeric housing 104 and operated to collapse the elastomeric housing 104, according to an example embodiment. The electro-magnetic coil 109 is operated to attract the ferromagnetic components 110 to the electro-magnetic coil 109 which draws in the interior surface 128 and the exterior surface 130 of the wall 126. Thus, the elastomeric housing 104 collapses inward in this state. The electro-magnetic coil 109 may be activated to attract all sides of the elastomeric housing 104 evenly due to a configuration and placement of the ferromagnetic components 110. In examples where the electro-magnetic coil 109 is suspended or otherwise mounted within the center area of the elastomeric housing 104, attraction of all sides of the elastomeric housing 104 in an even distribution may be more beneficial.

In FIG. 11, the ferromagnetic components 110 of the elastomeric housing 104 are repelled by the electro-magnetic coil 109 and the elastomeric housing 104 has a first volume as shown. In FIG. 12, the ferromagnetic components 110 of the elastomeric housing 104 are attracted to the electro-magnetic coil 109 and the elastomeric housing 104 has a second volume that is smaller than the first volume. In this manner, the elastomeric housing 104 is collapsible.

To operate the electro-magnetic coil 109, a first current may be applied to the electro-magnetic coil to generate the magnetic fields to attract the ferromagnetic components 110 of the elastomeric housing 104, and a second current may be applied to the electro-magnetic coil 109 that is in a direction opposite the first current so as to generate the magnetic fields to repel attract the ferromagnetic components 110 of the elastomeric housing 104. Operation of the electro-magnetic coil 109 may be manual, such as by manually operating the power source 111 for expansion and retraction of the elastomeric housing 104. In other examples, operation of the electro-magnetic coil 109 may be performed in a programmatic manner using a microprocessor programmed to cause the power source 111 to provide current of a corresponding polarity to the electro-magnetic coil 109 to attract or repel the ferromagnetic components 110 as needed to cause a rigid of flexible exterior surface 130. More or less power can be provided to the electro-magnetic coil 109 to create stronger or weaker magnetic fields. A strength of the magnetic field may be determined based on an application of use, or based on how much ferromagnetic material is included in the elastomeric housing 104, for example.

With the ferromagnetic components 110 evenly distributed through the elastomeric housing 104, a magnetic field generated by the electro-magnetic coil 109 may be evenly distributed to evenly attract or repel the wall 126 of the elastomeric housing 104. In one example, the electro-magnetic coil 109 generates magnetic fields to repel or attract the ferromagnetic components 110 of the elastomeric housing 104 to the electro-magnetic coil 109 along a cross-section of the elastomeric housing 104. In other examples, the electro-magnetic coil 109 generates the magnetic fields to repel or attract the ferromagnetic components 110 of the elastomeric housing 104 to the electro-magnetic coil 109 along a length of the elastomeric housing 104. Still further, the electro-magnetic coil 109 may generate the magnetic fields to repel or attract the ferromagnetic components 110 of the elastomeric housing 104 to the electro-magnetic coil 109 along the cross-section and along the length of the elastomeric housing 104. Operation of the electro-magnetic coil 109 may be performed to repel or attract the ferromagnetic components as needed based on a configuration of the part undergoing cure, for example.

Figure 13:
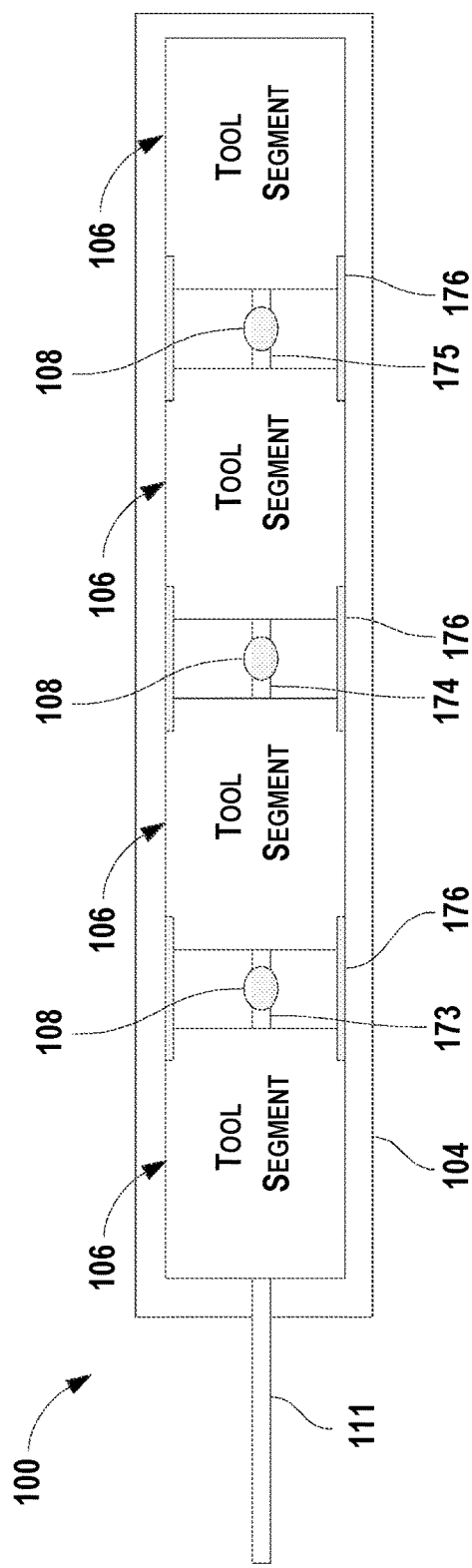
FIG. 13 illustrates an example of the mandrel including a plurality of tool segments connected to each other within the elastomeric housing, according to an example embodiment.

FIG. 13 illustrates an example of the mandrel 100 including a plurality of tool segments 106 connected to each other within the elastomeric housing 104, according to an example embodiment. In this example configuration, each tool segment 106 includes an electro-magnetic coil 109 and the elastomeric housing 104 includes the ferromagnetic components 110. The mandrel 100 also includes a plurality of the joint linkages 108 coupling or connecting the plurality of tool segments 106 in a sequential manner. The power source 111 is positioned outside of the elastomeric housing 104 and is connected to each of the electro-magnetic coils 109 through power cables 173, 174, and 175, for example. The plurality of joint linkages 108 allow for movement of the plurality of tool segments 106 with respect to each other.

Thus, in the example configuration shown in FIG. 13, each tool segment 106 includes an electro-magnetic coil 109 and the power source 111 functions to operate all of the tool segments 106 simultaneously. The interlocking tool segments 106 are positioned inside the elastomeric housing 104, which may be a flexible elastic bladder, and the joint linkages 108 allow for flexibility of the mandrel 100 so that the mandrel 100 can fit to a contour inside a stringer and also maintain rigidity. In some examples, some of the tool segments 106 may have different cross-sections to allow the mandrel 100 to accommodate variations in part cross-sections along a length of the part.

The joint linkages 108 provide separation between the tool segments 106, and allow for movement among the tool segments 106. The power cables 173, 174, and 175 are positioned through a respective tool segment 106 and attach to the respective joint linkage 108.

The joint linkages 108 couple to a substantially center region of the tool segments 106, and multiple connected plates 176 are provided to enclose respective gaps between adjacent tool segments 106. The multiple connected plates 176 slide over each other to allow for movement of the tool segments 106 with respect to each other.

Figure 14:
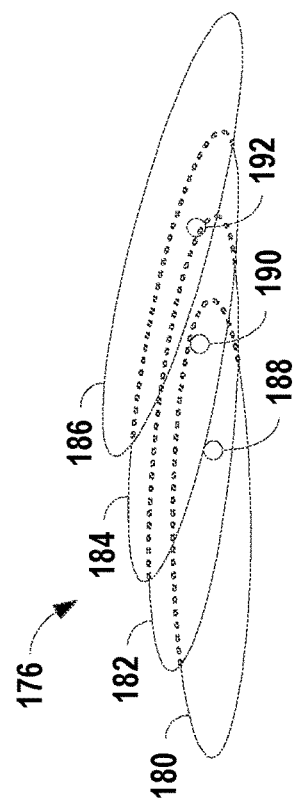
FIG. 14 illustrates an example of the multiple connected plates, according to an example embodiment.

FIG. 14 illustrates an example of the multiple connected plates 176, according to an example embodiment. The multiple connected plates include plates 180, 182, 184, and 186. The plate 180 is connected at pivot point 188 to the plate 182. The plate 182 is connected at pivot point 190 to the plate 184. The plate 184 is connected at pivot point 192 to the plate 186. The multiple connected plates 176 act like an elbow joint and allow the plates 180, 182, 184, and 186 to slide over each other to allow for movement while enclosing gaps between the tool segments 106. The plates 180, 182, 184, and 186 may be metal plates, plastics plates, rubber plates, etc., that allow for movement.

The mandrel 100 shown in FIG. 14 can be configured to have any number of tool segments 106 as needed for a particular use. As one example, for a repair of a composite part, a total length of the mandrel may be between about 6-12 inches long, and each tool segment 106 may be a few inches (e.g., 3-5 inch pieces). The length of the mandrel 100 can be extended by attaching on another tool segment 106 at an end joint linkage.

In operation, for a repair, the mandrel 100 can be operated to shrink or collapse to fit into a cavity of the composite part, and then operated to conform to a contour down a length of the cavity. The collapsible mandrel 100 is operated by providing a current down electromagnetic chain of electromagnetic coils 109 so that a magnetic field generated repels against the interior surface 128 of the elastomeric housing 104 causing the mandrel to expand or inflate. The mandrel 100 could be inserted into a contoured area, and then expanded and used as a structural rigid component. When the current is reversed, the magnetic field generated reverses and the wall 126 of the elastomeric housing 104 collapses so that the mandrel 100 can be easily removed from the area. Intensity of the magnetic field can be determined by an amount of current applied. This enables a pressure of the mandrel 100 against the composite being cured to be fine-tuned.

Figure 15:
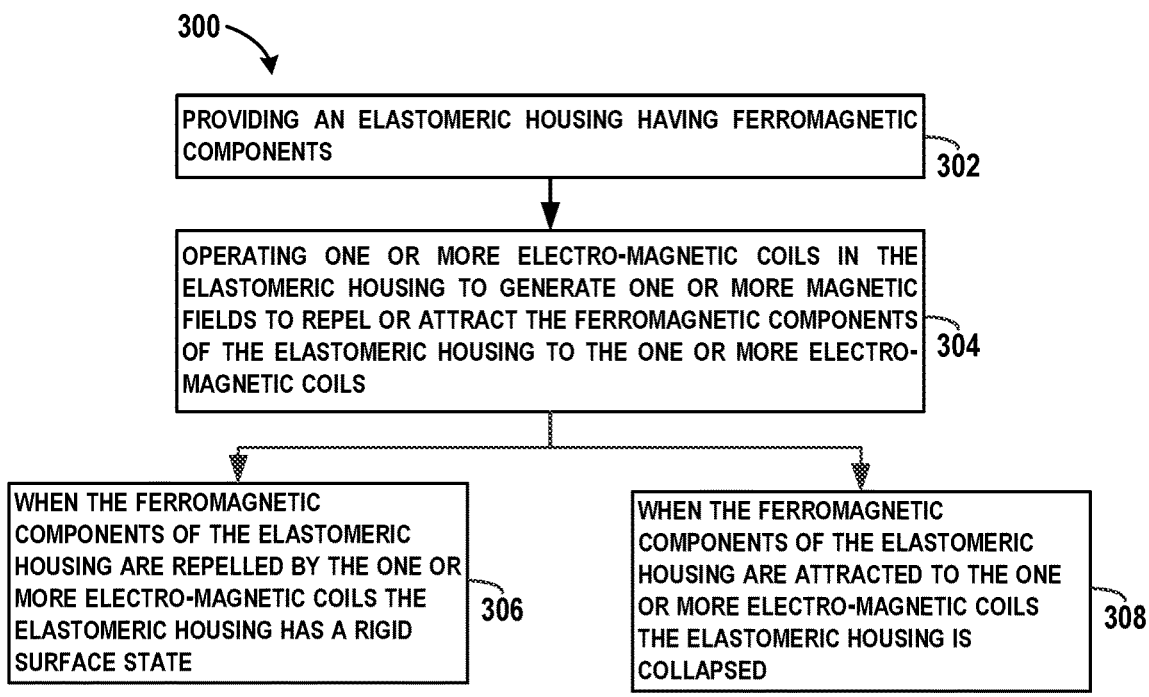
FIG. 15 shows a flowchart of an example method for operating the mandrel, according to an example embodiment.

FIG. 15 shows a flowchart of an example method 300 for operating the mandrel 100, according to an example embodiment. Method 300 shown in FIG. 15 presents an embodiment of a method that, for example, could be used for the mandrel shown in FIG. 1, for example. In some examples, components of the mandrel 100 may be arranged to be adapted to, capable of, or suited for performing the functions, such as when operated in a specific manner. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes providing the elastomeric housing 104 having the ferromagnetic components 110. At block 304, the method 300 includes operating one or more electro-magnetic coils 109 in the elastomeric housing 104 to generate one or more magnetic fields to repel or attract the ferromagnetic components 110 of the elastomeric housing 104 to the one or more electro-magnetic coils 109. At block 306, the method 300 includes when the ferromagnetic components 110 of the elastomeric housing 104 are repelled by the one or more electro-magnetic coils 109, the elastomeric housing 104 has a rigid surface state. At block 308, the method 300 includes when the ferromagnetic components 110 of the elastomeric housing 104 are attracted to the one or more electro-magnetic coils 109, the elastomeric housing 104 is collapsed.

Figure 16:
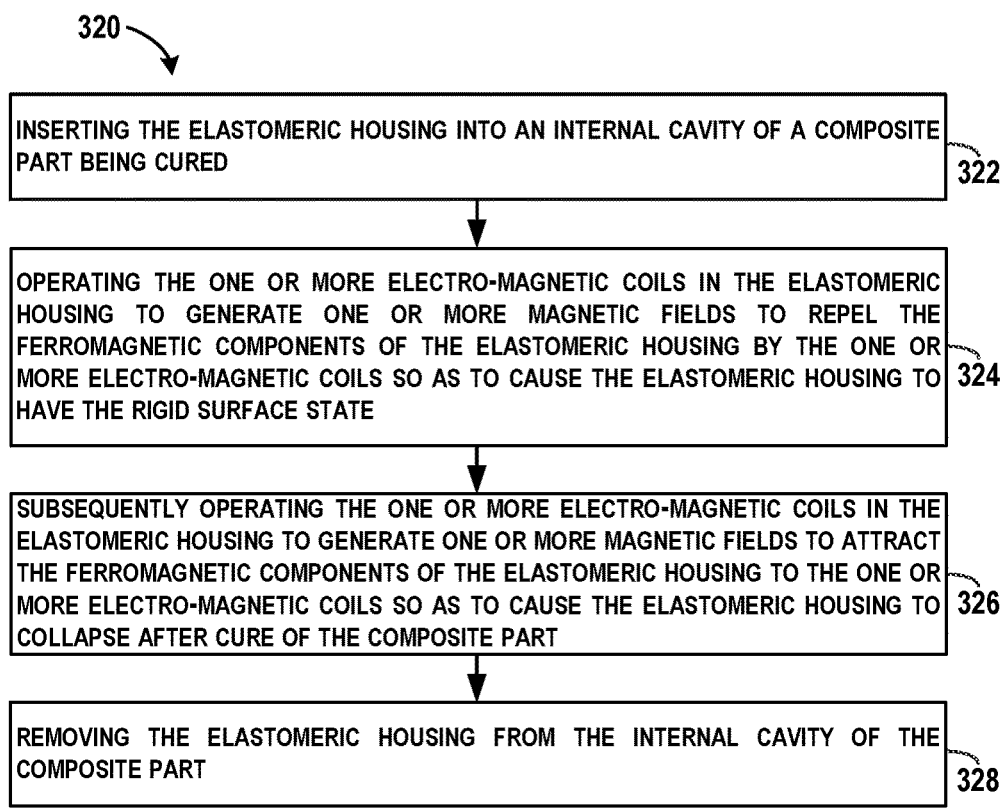
FIG. 16 shows a flowchart of another example method for operating the mandrel, according to an example embodiment.

FIG. 16 shows a flowchart of another example method 320 for operating the mandrel 100, according to an example embodiment. At block 322, the method 320 includes inserting the elastomeric housing 104 into an internal cavity 204 of a composite part 200 being cured. At block 324, the method 320 includes operating the one or more electro-magnetic coils 109 in the elastomeric housing 104 to generate one or more magnetic fields to repel the ferromagnetic components 110 of the elastomeric housing 104 by the one or more electro-magnetic coils 109 so as to cause the elastomeric housing 104 to have the rigid surface state. At block 326, the method 320 includes subsequently operating the one or more electro-magnetic coils 109 in the elastomeric housing 104 to generate one or more magnetic fields to attract the ferromagnetic components 110 of the elastomeric housing 104 to the one or more electro-magnetic coils 109 so as to cause the elastomeric housing 104 to collapse after cure of the composite part 200. At block 328, the method 320 includes removing the elastomeric housing 104 from the internal cavity 204 of the composite part 200.

In some examples, the mandrel 100 may be operated to progress through more than one energized cycle during curing, so as to cause the elastomeric housing 104 to have the rigid surface state and collapsed state multiple times depending on a type of part to be cured such that the elastomeric housing 104 may not be removed after one energized cycle, for example.

Thus, in operation, the mandrel 100 can be operated to have the rigid surface state for curing, and then collapsed to be removed from the cured part. Magnetic components and the use of a magnetic field replaces use of pneumatic or other pressure as needed for tooling applications.

Within examples, the mandrel 100 can be used during manufacture of composite parts, or during repair of composite parts. Embodiments of the disclosure may find use in a variety of potential applications, particularly in the transportation industry, including for example, aerospace, marine, automotive applications and other application where autoclave curing of composite parts may be used. As one example, embodiments of the disclosure may be used in the context of an aircraft manufacturing and service. Aircraft applications of the disclosed embodiments may include, for example, without limitation, curing of stiffener members such as, without limitation beams, spars and stringers, to name only a few.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method comprising:
providing an elastomeric housing having ferromagnetic components;
operating one or more electro-magnetic coils in the elastomeric housing to generate a first magnetic field to repel the ferromagnetic components of the elastomeric housing from the one or more electro-magnetic coils and to generate a second magnetic field to attract the ferromagnetic components of the elastomeric housing to the one or more electro-magnetic coils, wherein when the ferromagnetic components of the elastomeric housing are repelled by the one or more electro-magnetic coils the elastomeric housing has a rigid surface state and when the ferromagnetic components of the elastomeric housing are attracted to the one or more electro-magnetic coils the elastomeric housing is collapsed; and
providing a plurality of tool segments within the elastomeric housing and coupled in a sequential manner, wherein the one or more electro-magnetic coils comprise a plurality of electro-magnetic coils within the plurality of tool segments, and wherein the plurality of tool segments are positioned inside the elastomeric housing; and
providing joint linkages coupling each adjacent tool segment of the plurality of tool segments to each other, wherein the joint linkages enable flexibility of the plurality of tool segments and provide separation between each of the plurality of tool segments.

2. The method of claim 1, further comprising:
providing a plurality of power cables positioned through each of the plurality of tool segments and attached to respective joint linkages.

3. The method of claim 1, further comprising:
inserting the elastomeric housing into an internal cavity of a composite part being cured;

operating the one or more electro-magnetic coils in a progression through more than one energized cycle during curing of the composite part.

4. The method of claim 1, further comprising:
inserting the elastomeric housing into an internal cavity of a composite part;
operating the one or more electro-magnetic coils such that the elastomeric housing has the rigid surface state.

5. The method of claim 1, further comprising:
inserting the elastomeric housing into an internal cavity of a composite part being cured;
operating the one or more electro-magnetic coils such that the elastomeric housing is collapsed to be removed from the composite part after curing the composite part.

6. The method of claim 1, wherein the one or more electro-magnetic coils are operated to generate the first magnetic field by receiving a first current, and wherein the one or more electro-magnetic coils are operated to generate the second magnetic field by receiving a second current that is a direction opposite the first current.

7. The method of claim 1, further comprising:
inserting the elastomeric housing into an internal cavity of a composite part being cured;
operating the one or more electro-magnetic coils in the elastomeric housing to generate the first magnetic field to repel the ferromagnetic components of the elastomeric housing by the one or more electro-magnetic coils so as to cause the elastomeric housing to have the rigid surface state;
subsequently operating the one or more electro-magnetic coils in the elastomeric housing to generate the second magnetic field to attract the ferromagnetic components of the elastomeric housing to the one or more electro-magnetic coils so as to cause the elastomeric housing to collapse after cure of the composite part; and
removing the elastomeric housing from the internal cavity of the composite part.

8. The method of claim 1, wherein the ferromagnetic components are adhesively fixed on an interior surface of at least one of a plurality of walls of the elastomeric housing using an epoxy.

9. The method of claim 1, wherein when the ferromagnetic components of the elastomeric housing are attracted to the one or more electro-magnetic coils, an interior surface of a wall of the elastomeric housing is drawn inward.

10. The method of claim 1, wherein the ferromagnetic components are embedded within at least one of a plurality of walls of the elastomeric housing.

11. The method of claim 1, wherein the ferromagnetic components are positioned on an interior surface of at least one of a plurality of walls of the elastomeric housing.

12. The method of claim 1, wherein the ferromagnetic components are positioned on an exterior surface of at least one of a plurality of walls of the elastomeric housing.

13. A mandrel comprising:
an elastomeric housing having a polarized magnetic material;
one or more electro-magnetic coils positioned within the elastomeric housing and operable to generate a first magnetic field to repel the polarized magnetic material of the elastomeric housing from the one or more electro-magnetic coils and to generate a second magnetic field to attract the polarized magnetic material of the elastomeric housing to the one or more electro-magnetic coils, wherein when the polarized magnetic material of the elastomeric housing is repelled by the one or more electro-magnetic coils the elastomeric housing has a first volume and when the polarized magnetic material of the elastomeric housing is attracted to the one or more electro-magnetic coils the elastomeric housing has a second volume that is smaller than the first volume;
a plurality of tool segments within the elastomeric housing and coupled in a sequential manner, wherein the one or more electro-magnetic coils comprise a plurality of electro-magnetic coils within the plurality of tool segments; and
joint linkages coupling each adjacent tool segment of the plurality of tool segments to each other, wherein the joint linkages enable flexibility of the plurality of tool segments and provide separation between each of the plurality of tool segments.

14. The mandrel of claim 13, wherein the polarized magnetic material comprises ferromagnetic components, and wherein the elastomeric housing comprises a mixture of ferromagnetic components and rubber.

15. The mandrel of claim 13, wherein the polarized magnetic material is positioned on an interior wall or an exterior surface of the elastomeric housing.

16. The mandrel of claim 13, wherein the polarized magnetic material is positioned laterally along the elastomeric housing so as to be linearly perpendicular to a centerline of the elastomeric housing or longitudinally along the elastomeric housing so as to be linearly parallel to the centerline of the elastomeric housing.

17. The mandrel of claim 13, wherein the polarized magnetic material is adhesively fixed on an interior surface of at least one of a plurality of walls of the elastomeric housing using an epoxy.

18. The mandrel of claim 13, further comprising:
a plurality of power cables positioned through each of the plurality of tool segments and attached to respective joint linkages.

19. The mandrel of claim 13, wherein the one or more electro-magnetic coils are operated to generate the first magnetic field by receiving a first current, and wherein the one or more electro-magnetic coils are operated to generate the second magnetic field by receiving a second current that is a direction opposite the first current.

20. The mandrel of claim 13, wherein when the polarized magnetic material of the elastomeric housing is attracted to the one or more electro-magnetic coils, an interior surface of a wall of the elastomeric housing is drawn inward.

* * * * *